United States Patent
Tian et al.

(10) Patent No.: US 11,564,073 B2
(45) Date of Patent: Jan. 24, 2023

(54) SYSTEM AND METHOD FOR EMOTION DETECTION AND INTER-VEHICLE COMMUNICATION

(71) Applicant: Honda Motor Co., Ltd., Tokyo (JP)

(72) Inventors: Danyang Tian, Ann Arbor, MI (US); Xue Bai, Novi, MI (US)

(73) Assignee: HONDA MOTOR CO., LTD., Tokyo (JP)

(*) Notice: Subject to any disclaimer, the term of this patent is extended or adjusted under 35 U.S.C. 154(b) by 390 days.

(21) Appl. No.: 16/819,908

(22) Filed: Mar. 16, 2020

(65) Prior Publication Data
US 2021/0289330 A1    Sep. 16, 2021

(51) Int. Cl.
| | |
|---|---|
| *H04W 4/46* | (2018.01) |
| *B60W 50/14* | (2020.01) |
| *G06K 9/00* | (2022.01) |
| *G06V 20/59* | (2022.01) |

(52) U.S. Cl.
CPC .............. *H04W 4/46* (2018.02); *B60W 50/14* (2013.01); *G06V 20/597* (2022.01)

(58) Field of Classification Search
CPC ......... H04W 4/46; H04W 4/80; B60W 50/14; G06V 20/597; G06V 20/59; G06V 40/174; G06V 40/28
See application file for complete search history.

(56) References Cited

U.S. PATENT DOCUMENTS

| | | | |
|---|---|---|---|
| 7,095,318 B1* | 8/2006 | Bekhor | B60Q 1/268 340/464 |
| 9,610,510 B2 | 4/2017 | Comploi | |
| 9,623,876 B1* | 4/2017 | Slusar | G08G 1/22 |
| 9,654,738 B1* | 5/2017 | Ferguson | H04N 7/18 |
| 9,896,100 B2* | 2/2018 | Gordon | B60W 30/16 |
| 10,192,171 B2 | 1/2019 | Taylor | |
| 10,261,513 B2 | 4/2019 | Reiley et al. | |
| 10,401,860 B2 | 9/2019 | Krupat et al. | |
| 11,443,557 B2* | 9/2022 | Stokman | G06V 40/28 |
| 2016/0355192 A1* | 12/2016 | James | B60W 50/14 |
| 2017/0124407 A1* | 5/2017 | Micks | G06V 10/50 |
| 2017/0240096 A1* | 8/2017 | Ross | B60Q 5/005 |

(Continued)

FOREIGN PATENT DOCUMENTS

| | | |
|---|---|---|
| CN | 110053613 | 7/2019 |
| JP | 2019105941 | 6/2019 |

(Continued)

*Primary Examiner* — Mussa A Shaawat
(74) *Attorney, Agent, or Firm* — Rankin, Hill & Clark LLP

(57) ABSTRACT

A computer-implemented method for emotion detection and communication includes receiving host passenger data for a host passenger of a host vehicle and determining an emotion of the host vehicle based on the host passenger data. The method includes communicating the emotion of the host vehicle to one or more remote vehicles and an emotion of the one or more remote vehicles to the host vehicle. Further, the method includes generating an output based on the emotion of the host vehicle and the emotion of the one or more remote vehicles. The output is an interactive user interface providing an indication of the emotion of the host vehicle and an indication of the emotion of the one or more remote vehicle. The method includes rendering the output to a human machine interface device.

14 Claims, 4 Drawing Sheets

(56) References Cited

U.S. PATENT DOCUMENTS

| | | |
|---|---|---|
| 2018/0174457 A1* | 6/2018 | Taylor .............. G08G 1/096741 |
| 2018/0196432 A1* | 7/2018 | Krupat ..................... A61B 5/18 |
| 2019/0133510 A1 | 5/2019 | el Kaliouby et al. |
| 2019/0152492 A1 | 5/2019 | el Kaliouby et al. |
| 2019/0185014 A1 | 6/2019 | Choo |
| 2019/0265703 A1 | 8/2019 | Hicok et al. |
| 2020/0242421 A1* | 7/2020 | Sobhany ................ G06F 3/011 |
| 2021/0001862 A1* | 1/2021 | Senechai .............. G06V 20/593 |
| 2021/0188291 A1* | 6/2021 | el Kaliouby ........... G06Q 50/30 |
| 2021/0203955 A1* | 7/2021 | Coza ..................... G06V 20/52 |

FOREIGN PATENT DOCUMENTS

| | | |
|---|---|---|
| JP | 2019199169 | 11/2019 |
| WO | 20180163491 | 9/2018 |

* cited by examiner

SYSTEM AND METHOD FOR EMOTION DETECTION AND INTER-VEHICLE COMMUNICATION

BACKGROUND

Autonomous vehicles can have a significant beneficial impact on human mobility. However, there are possible social implications to removing drivers from vehicles. For example, autonomous vehicles with only passengers and not drivers, can require sacrifices in social opportunities and possibly increase isolation of the autonomous vehicle and the passengers to other on-road vehicles and passengers. Additionally, removing the actual act of driving can affect the emotions and sense of pleasure for passengers. Autonomous vehicles and passengers should not be isolated from other on-road vehicles and passengers.

BRIEF DESCRIPTION

According to one aspect, a computer-implemented method for emotion detection and communication includes receiving host passenger data for a host passenger of a host vehicle and determining an emotion of the host vehicle based on the host passenger data. The method includes communicating the emotion of the host vehicle to one or more remote vehicles and an emotion of the one or more remote vehicles to the host vehicle. The method includes generating an output based on the emotion of the host vehicle and the emotion of the one or more remote vehicles. The output is an interactive user interface providing an indication of the emotion of the host vehicle and an indication of the emotion of the one or more remote vehicles. Further, the method includes rendering the output to a human machine interface device.

According to another aspect, a system for emotion detection and communication includes sensors for capturing host passenger data for a host passenger of a host vehicle and for capturing remote passenger data for a remote passenger of a remote vehicle. The system includes a human machine interface, a display, and a processor. The processor is operatively connected for computer communication to the sensors, the human machine interface, and the display. The processor determines an emotion of the host vehicle based on the host passenger data and an emotion of the remote vehicle based on the remote passenger data. The processor generates an output based on the emotion of the host vehicle and the emotion of the remote vehicle. The output is an interactive user interface providing an indication of the emotion of the host vehicle and an indication of the emotion of the remote vehicle. Further, the processor transmits the output to the display.

According to a further aspect, a non-transitory computer-readable storage medium including instructions that when executed by a processor, causes the processor to receive host passenger data for a host passenger of a host vehicle and determine an emotion of the host vehicle based on the host passenger data. The processor transmits the emotion of the host vehicle to one or more remote vehicles and generates an output based on the emotion of the host vehicle and an emotion of the one or more remote vehicles, The output is an interactive user interface providing an indication of the emotion of the host vehicle and an indication of the emotion of the one or more remote vehicles. Further, the processor renders the output to a human machine interface device.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1A:
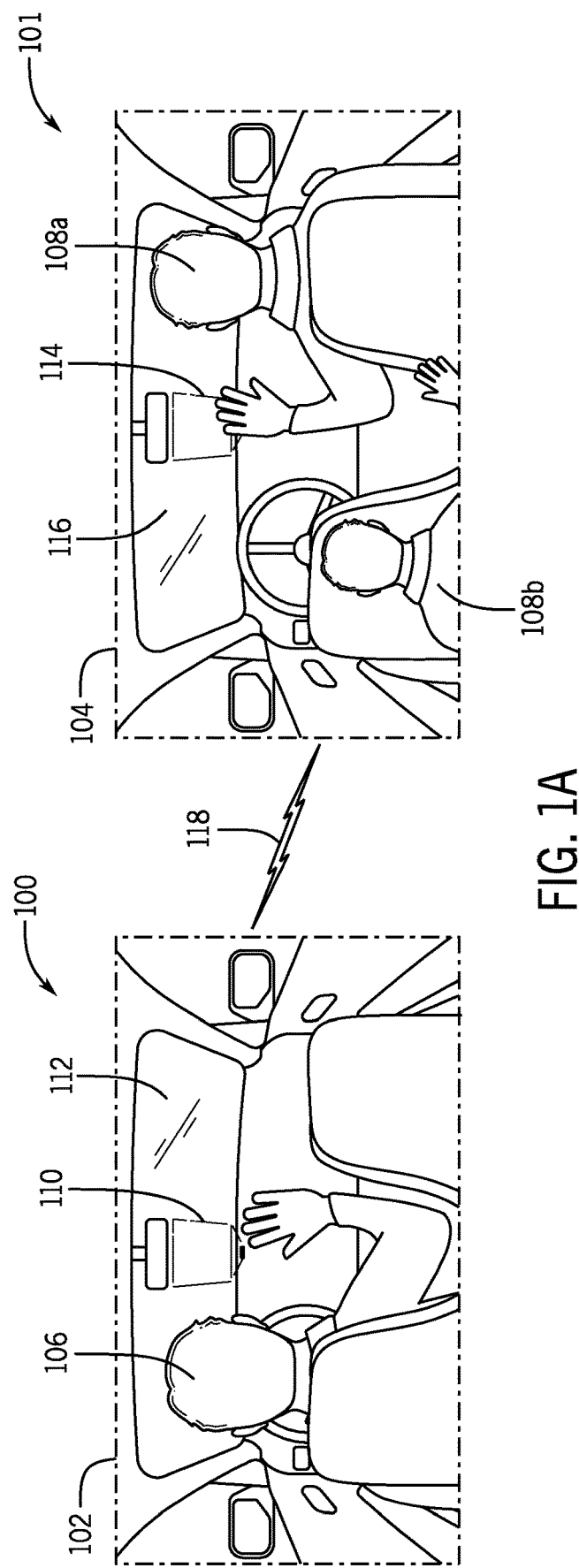
FIG. 1A is a schematic view of a host vehicle and a remote vehicle implementing a system for emotion detection and inter-vehicle communication based on according to an exemplary embodiment.

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Vehicle control system," and/or "vehicle system," as used herein may include, but is not limited to, any automatic or manual systems that may be used to enhance the vehicle, driving, and/or security. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Referring now to the drawings, wherein the showings are for purposes of illustrating one or more exemplary embodiments and not for purposes of limiting same, FIG. 1A an illustrative example of a host vehicle and a remote vehicle implementing a system for emotion detection and inter-vehicle communication according to an exemplary embodiment. In particular, FIG. 1A shows an interior view 100 of a host vehicle 102 and an interior view 101 of a remote vehicle 104. The host vehicle 102 and the remote vehicle 104 are engaged in inter-vehicle communication according to exemplary embodiments discussed herein. Although not shown in FIG. 1A, it is understood that the host vehicle 102 can be engaged in inter-vehicle communication with more than one vehicle (e.g., one or more remote vehicles, a plurality of remote vehicles).

In FIG. 1A, the host vehicle 102 and the remote vehicle 104 are autonomous vehicles. The host vehicle 102 is carrying a host passenger 106. The remote vehicle 104 is carrying a first remote passenger 108a and a second remote passenger 108b. However, it is understood that the host vehicle 102 and/or the remote vehicle 104 can carry any number of passengers. The host vehicle 102 also includes a heads-up display (HUD) 110 disposed on a windshield 112. As will be discussed herein, an interactive user interface can be displayed on the HUD 110. Similarly, the remote vehicle 104 includes a heads-up display (HUD) 114 disposed on a windshield 116. Similarly, another interactive user interface can be displayed on the HUD 114. In this example, the host vehicle 102 and the remote vehicle 104 are configured for inter-vehicle communication via an inter-vehicle communication channel 118. The components of FIG. 1A will now be described in detail.

Figure 1B:
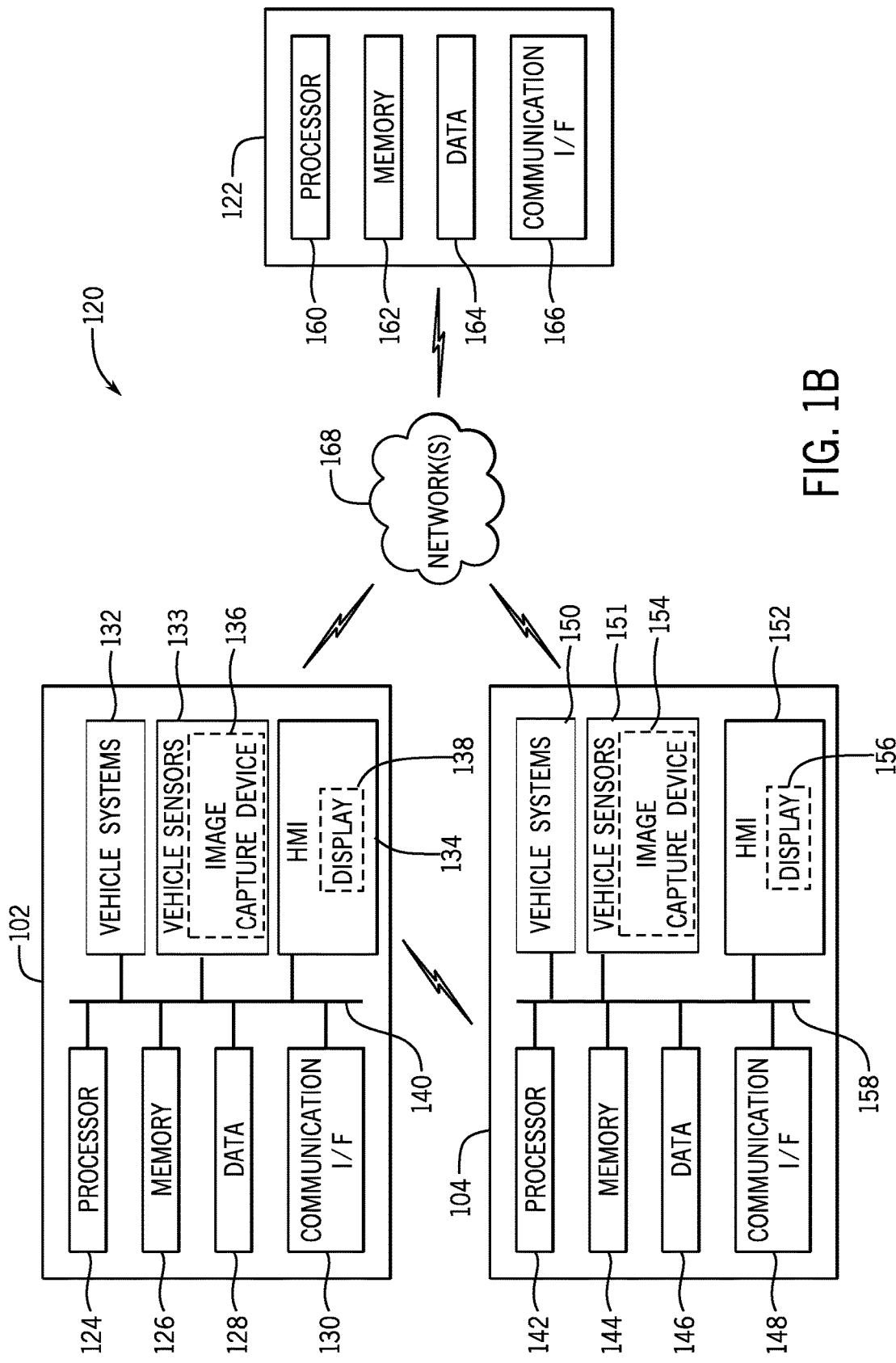
FIG. 1B is a block diagram of a system for emotion detection and inter-vehicle communication based on emotion detection according to an exemplary embodiment.

FIG. 1B is a block diagram of a system for emotion detection and inter-vehicle communication according to an exemplary embodiment. Specifically, the system 120 includes the host vehicle 102, the remote vehicle 104, and a third-party server 122. As mentioned above, in some embodiments, the system 120 can include more than one remote vehicle 104. Although not shown in FIG. 1B, the remote vehicle 104 can be referred to as one or more remote vehicles 104 and/or a plurality of remote vehicles 104. For simplicity and clarity of illustration, reference numerals have been repeated among the different figures where appropriate to indicate corresponding or analogous elements.

The host vehicle 102 includes a processor 124, a memory 126, data 128, a communication interface (I/F) 130, vehicle systems 132, vehicle sensors 133, and a human machine interface (HMI) 134, each of which are operatively connected for computer communication using, for example, the bus 140, or other wired and/or wireless technologies described herein. The processor 124 can include logic circuitry with hardware, firmware, and software architecture frameworks for facilitating control of the host vehicle 102 and facilitating communication between the host vehicle 102, the remote vehicle 104, and the third-party server 122.

Thus, in some embodiments, the processor 124 can store application frameworks, kernels, libraries, drivers, application program interfaces, among others, to execute and control hardware and functions discussed herein. In some embodiments, the memory 126 and/or the data 128 (e.g., disk, database, data store) can store similar components as the processor 124 for execution by the processor 124.

The communication I/F 130 can include network interface controllers (not shown) and other hardware and software that manages and/or monitors connections and controls bi-directional data transfer between the communication I/F 130 and other components of the system 120 using, for example, network(s) 168. In particular, the communication I/F 130 can facilitate communication (e.g., exchange data and/or transmit messages) with other vehicles (e.g., the remote vehicle 104) and/or devices (e.g., the third-party server 122), using any type of communication hardware and/or protocols discussed herein. In one embodiment, the communication I/F 130 facilitates establishing and managing the inter-vehicle communication channel 118 (FIG. 1A).

As mentioned above, the vehicle systems 132 can include, but are not limited to, any automatic or manual systems that can be used to enhance the vehicle, driving, and/or safety. The vehicle systems 132, in some embodiments, can include the vehicle sensors 133 for measuring different stimuli (e.g., a signal, a property, a measurement, a quantity) associated with the host vehicle 102 and/or a particular vehicle system. The vehicle sensors 133 can include various types of sensors for use with the host vehicle 102 and/or the vehicle systems 132 for detecting and/or sensing a parameter of the host vehicle 102, the vehicle systems 132, and/or the interior or exterior environment surrounding the host vehicle 102.

The vehicle sensors 133 may include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, biometric sensors, physiological sensors, among others. It is also understood that the vehicle sensors 133 may be any type of sensor, for example, acoustic, electric, environmental, optical, imaging, light, pressure, force, thermal, temperature, proximity, among others. Further, the vehicle sensors 133 can be disposed in one or more portions of the host vehicle 102, worn by the host passenger 106, integrated into a portable device (not shown), carried by the host passenger 106, integrated into an article of clothing (not shown) worn by the host passenger 106, or integrated into the body of the host passenger 106.

In FIG. 1A, the vehicle sensors 133 include an image capture device 136. The image capture device 136 can be any type of image capture sensor and/or device, for example, a charge-coupled device sensor (CCD sensor), a complementary metal-oxide-semiconductor (CMOS), or a hybrid semiconductor imaging technology. The image capture device 136 can be high definition capable of high definition imaging or video capture with a wide-angle capture. The image capture device 136 can include various calibration and processing functions to capture an image or a video and output a desired image. The image capture device 136 can be mounted on (e.g., exterior) and/or inside (e.g., interior, in-cabin) the host vehicle 102, for example, mounted on a windshield, a front dashboard, a grill, a rear-view mirror, among others. In another embodiment, the image capture device 136 can include a portable device (not shown) associated with the host passenger 106 with image capture hardware and functionality (e.g., a camera, a smartphone). The images provided by the image capture device 136 can be in any type, for example, two-dimensional, three-dimensional, and stereo, among others.

In one embodiment, the processor 124 uses the image capture device 136 to capture host passenger data for a host passenger 106 of the host vehicle 102. As will be discussed herein, the host passenger data can be used to determine an emotion of the host vehicle 102 and/or the host passenger 106. For example, the image capture device 136 can provide information (e.g., images, video) of the body, face, extremities, and/or head of the host passenger 106. Thus, the images and/or video captured by the image capture device 136 can include and/or provide information on eye movements, mouth movements, facial movements, facial recognition, head movements, body movements, hand postures, hand placement, body posture, and gesture recognition, among others.

The HMI 134 is capable of receiving input from a user (e.g., the host passenger 106) and/or providing feedback (e.g., output) to the user (e.g., the host passenger 106). The HMI 134 can receive one or more user inputs from one or more users (e.g., the host passenger 106). The HMI 134 may enable a user, such as the host passenger 106, to interact with or provide input, such as user input, gestures, clicks, points, selections, voice commands, among others. For example, as will be discussed herein, the host passenger 106 can communicate with the remote vehicle 104 by interacting with the HMI 134.

The HMI 134 can render and/or output information (e.g., graphics, warnings, and notifications). For example, the HMI 134 can generate information, interfaces, suggestions, warnings, and/or alerts and provide the same to the host vehicle 102 using, for example the display 138 (e.g., a human machine interface device). The HMI 134 can also include other systems that provide visual, audible, and/or tactile/haptic feedback to the host passenger 106. As mentioned above, the HMI 134 can be implemented as the display 138, which can be used for input and/or output. For example, the display 138 can be a touch screen, a touchpad, among others. As shown in FIG. 1A, the display 138 is implemented as a HUD 110. As will be discussed in more detail herein, the display 138 can output an interactive user interface 200 of FIG. 2. The interactive user interface 200 allows the host passenger 106 to visualize the emotions of other vehicles and/or passengers (e.g., the remote vehicle 104, the remote passengers 108) surrounding the host vehicle 102.

Referring again to FIG. 1B, the remote vehicle 104 includes a processor 142, a memory 144, data 146 (e.g., a disk, a database, a data store), a communication interface (I/F) 148, vehicle systems 150, vehicle sensors 151, and a human machine interface (HMI) 152, each of which are operatively connected for computer communication using, for example, the bus 158, or other wired and/or wireless interfaces described herein. Similar to the host vehicle 102, the vehicle sensors 151 can include an image capture device 154 and the HMI 152 can include a display 156. For purposes of simplicity, liked named components of the remote vehicle 104 can include the same and/or similar features and functions as described herein with the host vehicle 102, and are not discussed in detail herein.

Referring again to the system 120, the third-party server 122 includes a processor 160, a memory 162, data 164 (e.g., a disk, a database, a data store), and a communication interface (I/F) 166. The processor 160 can include logic circuitry with hardware, firmware, and software architecture frameworks for facilitating control of the third-party server 122 and facilitating communication between the host vehicle 102, the remote vehicle 104, and the third-party server 122. Thus, in some embodiments, the processor 160 can store application frameworks, kernels, libraries, drivers, application program interfaces, among others, to execute and control hardware and functions discussed herein. In some embodiments, the memory 162 and/or the data 164 (e.g., disk, database, data store) can store similar components as the processor 160 for execution by the processor 160.

The communication I/F 166 can include network interface controllers (not shown) and other hardware and software that manages and/or monitors connections and controls bi-directional data transfer between the communication I/F 166 and other components of the system 120 using, for example, network(s) 168. In particular, the communication I/F 130 can facilitate communication (e.g., exchange data and/or transmit messages) with the host vehicle 102, the remote vehicle 104, and/or other devices connected for computer communication via the host vehicle 102, the remote vehicle 104, and/or the network(s), using any type of communication hardware and/or protocols discussed herein. In some embodiments described herein, the third-party server 122 can perform one or more of the operations of the host vehicle 102 and/or the remote vehicle 104.

Exemplary methods for emotion detection and inter-vehicle communication implementing and referencing the components of FIGS. 1A, 1B, and 2 will now be described. FIG. 3 is a process flow diagram of a method for emotion detection and inter-vehicle communication according to an exemplary embodiment. Specifically, FIG. 3 describes operations of one or more components of the host vehicle 102, the remote vehicle 104, and/or the third-party server 122. Although the methods described herein are from the perspective of the host vehicle 102, it is understood that the remote vehicle 104 and/or the third-party server 122 can perform one or more similar operations.

At block 302, the method 300 includes receiving passenger data. Passenger data can include, but is not limited to, any data about one or more passengers carried by a vehicle and related to an emotional state of the one or more passengers. For example, passenger data can include physiological information and/or behavioral information related to an emotional state of a passenger. Physiological information includes information about an internal characteristic of the passenger, for example, heart rate, blood pressure, respiratory rate, perspiration rate, among others. Behavioral information includes information about the passenger derived extrinsically, for example, eye movements, mouth movements, facial movements, facial recognition, head movements, body movements, hand postures, hand placement, body posture, and gesture recognition, among others. In some embodiments, the passenger data can also include vehicle information that correlates to an emotional state of the passenger. For example, vehicle acceleration, velocity, braking, direction, route, destination, among others.

An emotional state and/or an emotion, as used herein, is a measurement of a state of a passenger. For example, an emotional state and/or an emotion can be angry, annoyed, irritated, peaceful, relaxed, calm, happy, content, sad, unhappy, depressed, and somber, among others. In some embodiments, the emotional state and/or the emotion can be quantified, for example, as a level or any other numerical or other kind of value for distinguishing between emotions. For example, very happy, slightly happy, slightly depressed, and 90% happy and 100% sad, among others.

Referring again to block 302, the processor 124 can receive host passenger data for the host passenger 106 of the host vehicle 102. The processor 124 can receive and/or capture the host passenger data using the vehicle systems 132 and/or the vehicle sensors 133. In particular, in one embodiment, the image capture device 136 is used to capture images of the host passenger (e.g., eye movements, facial movements, positioning, and posture). As will be discussed herein, the host passenger data can be used to determine an emotion of the host vehicle 102 and/or the host passenger 106.

In some embodiments, block 302 includes receiving remote passenger data for a remote passenger of one or more remote vehicles. For example, the processor 124 and/or the processor 160 can receive remote passenger data from the remote vehicle 104. The remote passenger data can include remote passenger data about the first remote passenger 108*a* and/or remote passenger data about the second remote passenger 108*b*. Similar to the host vehicle 102, the processor 142 of the remote vehicle 104 can receive and/or capture the remote passenger data from the vehicle systems 150, the vehicle sensors 151, and/or the image capture device 154. As will be discussed in further detail herein, the remote passenger data can be used to determine an emotion of the remote vehicle 104 and/or the remote passengers 108.

Referring again to FIG. 3, at block 304, the method 300 includes determining emotions. More specifically, at block 304, the processor 124 determines an emotion of the host vehicle 102 and/or the host passenger 106 based on the host passenger data. The emotion can indicate the emotion of the host passenger 106 and/or the emotion of all passengers carried by the host vehicle 102.

In some embodiments, block 304 includes determining an emotion of the remote vehicle 104 and/or the remote passengers 108 based on the remote passenger data. For example, the processor 124 can determine the emotion of the first remote passenger 108*a* based on remote passenger data about the first remote passenger 108*a* and/or the emotion of the second remote passenger 108*b* based on remote passenger data about the second remote passenger 108*b*. In this embodiment, it is possible to determine more than one emotion, namely, a first emotion for the first remote passenger 108*a* and a second emotion for the second passenger 108*b*. In some embodiments, the processor 142 can determine an emotion of the remote vehicle 104 that represents the collective emotions (e.g., both the first emotion and the second emotion) of all remote passengers 108 carried by the remote vehicle 104. For example, the processor 142 can calculate the emotion of the remote vehicle 104 as an average of the first emotion and/or the second emotion.

Referring again to FIG. 3, at block 306, the method 300 includes communicating the emotions. For example, the host vehicle 102 and the remote vehicle 104 are capable of sharing (e.g., transmitting) emotions about their respective passengers. The host vehicle 102 is capable of receiving emotion data of one or more remote vehicles 104, and the remote vehicle 104 is capable of receiving emotion data of the host vehicle 102. More specifically, in one embodiment, the processor 124 with the communication I/F 130 transmits the emotion of the host vehicle 102 (e.g., the emotion of the host passenger 106) to one or more remote vehicles, for example, the remote vehicle 104.

In one embodiment, the processor 124 communicates the emotion of the host vehicle 102 to remote vehicles 104 that are within a predetermined area surrounding the host vehicle 102. As an illustrative example, remote vehicles 104 that are within a one (1) mile radius of the host vehicle 102. In another embodiment, the processor 124 communicates the emotion of the host vehicle 102 to remote vehicles 104 that are within a predetermined area surrounding the host vehicle 102 and/or are on the same route and/or the same destination as the host vehicle 102. In another embodiment, the processor 142 with the communication I/F 148 transmits the emotion of the remote vehicle 104 (e.g., the emotion of the first remote passenger 108*a*, the emotion of the second remote passenger 108*b*) to one or more other remote vehicles 104 and/or the host vehicle 102. Similar to the host vehicle 102, the processor 142 can communicate the emotion of the remote vehicle 104 to other remote vehicles 104 that are within a predetermined area surrounding the remote vehicle 104 and/or are on the same route and/or the same destination as the remote vehicle 104.

Figure 4:
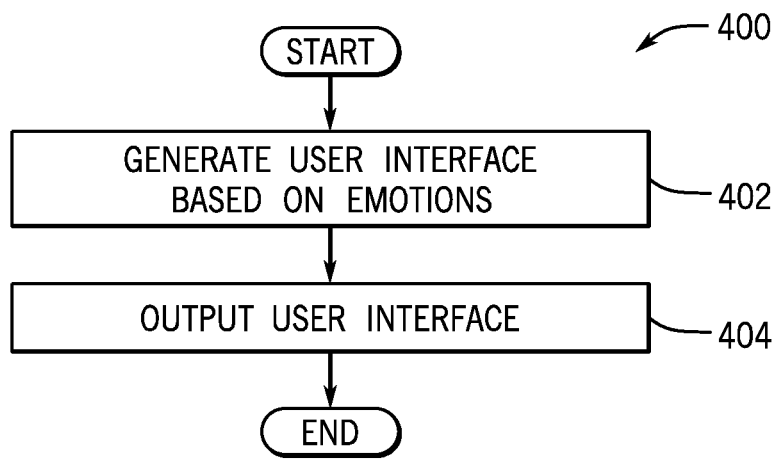
FIG. 4 is a process flow diagram of a method of inter-vehicle communication according to an exemplary embodiment.

In some embodiments, communicating emotions at block 306 also includes presenting the emotions to a user so that the user can visualize the emotions of other vehicles and/or passengers. This embodiment will now be described in more detail with respect to FIG. 4 which shows a process flow diagram of a method 400 for inter-vehicle communication based on emotion detection according to an exemplary embodiment. Specifically, FIG. 4 describes operations of one or more components of the host vehicle 102, the remote vehicle 104, and/or the third-party server 122. At block 402, the method 400 includes generating a user interface based on the emotions.

For example, the processor 124 using the HMI 134 can generate an output based on the emotion of the host vehicle 102 and/or the emotion of the remote vehicle 104. The output can be an interactive user interface providing an indication of the emotion of the host vehicle 102 and/or an indication of the emotion of the remote vehicles 104. Referring now to FIG. 2, an illustrative exemplary interactive user interface 200 according to the perspective of the host vehicle 102 is shown. In some embodiments, the HMI 134 generates the interactive user interface 200 and outputs same using the display 138. For example, the interactive user interface 200 can be rendered to the HUD 110 of FIG. 1A. In FIG. 2, the interactive user interface 200 is a graphical user interface showing a representation of the host vehicle 102 and representations of the remote vehicles 104. The representations visually present the emotions of each of the remote vehicles 104. Thus, in this embodiment, the interactive user interface 200 is a top view map representation of the host vehicle 102 and the one or more remote vehicles 104.

Figure 2:
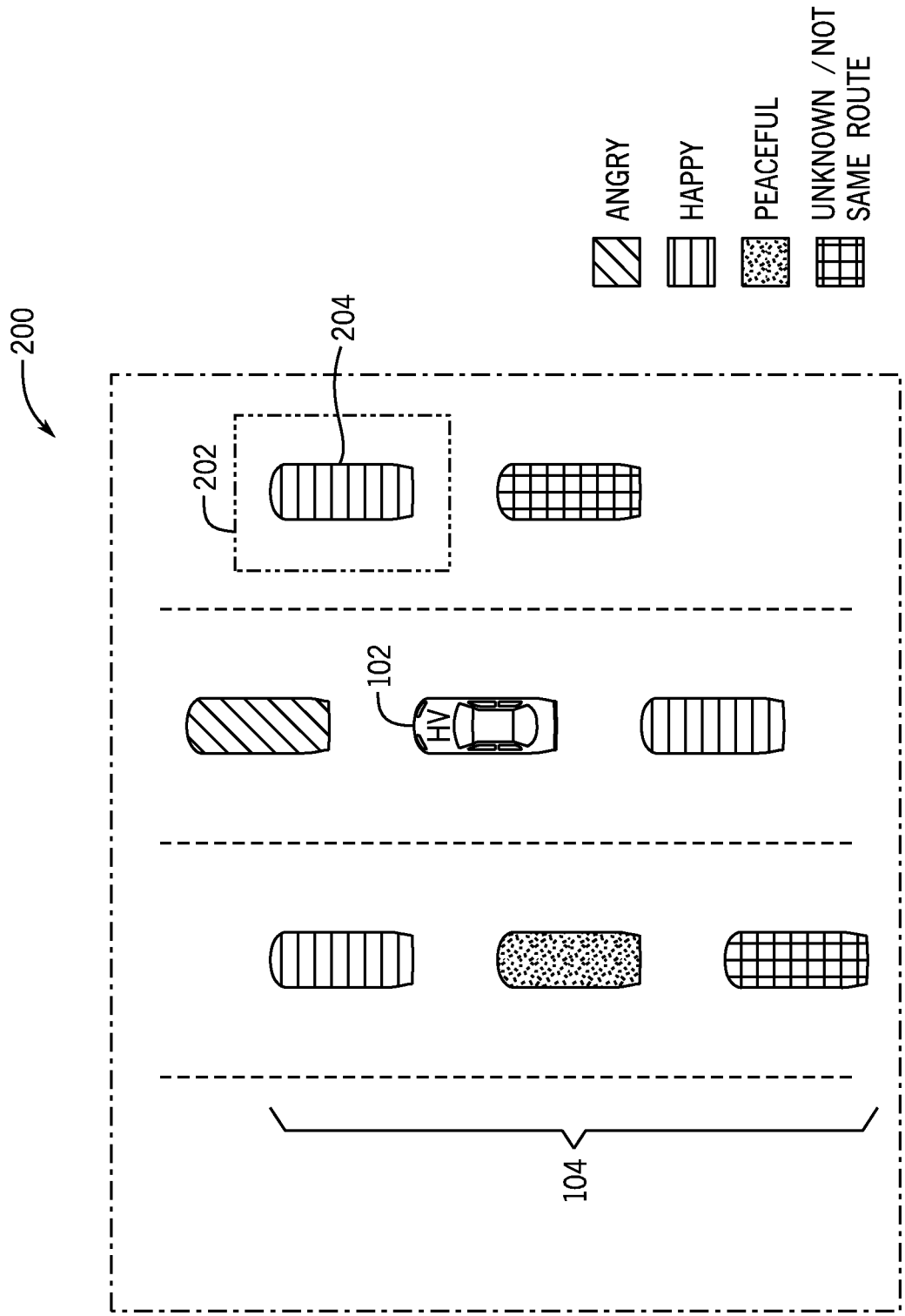
FIG. 2 is an illustrative example of an interactive user interface according to an exemplary embodiment.
Figure 3:
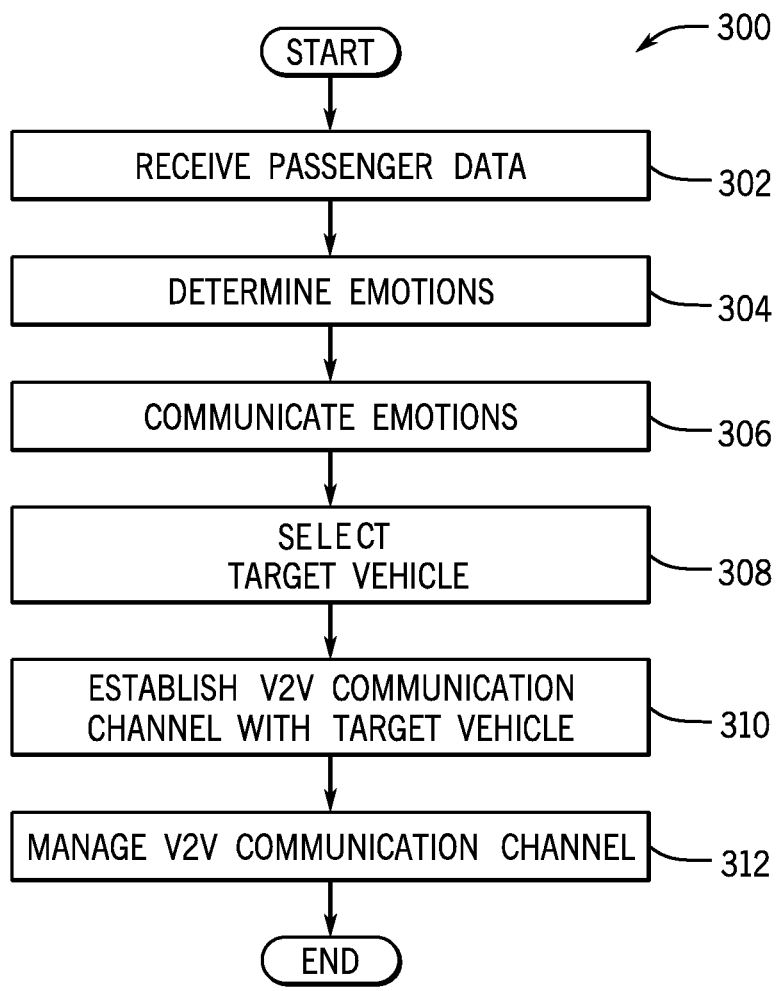
FIG. 3 is a process flow diagram of a method for emotion detection and inter-vehicle communication based on emotion detection according to an exemplary embodiment.

In FIG. 2, each of the remote vehicles 104 are presented in a pattern and/or color that represents the emotion associated with that remote vehicle 104. This allows the host passenger 106 to easily understand the emotions of surrounding remote vehicles 104 and/or remote passengers 108. For example, in FIG. 2, a diagonal line pattern indicates an emotion of angry, a horizontal line pattern indicates an emotion of happy, a dotted pattern indicates an emotion of peaceful, and a crosshatch pattern indicates an emotion that is unknown and/or not on the same route as the host vehicle 102.

Although not shown in FIG. 2, the emotion of the host vehicle 102 can also be shown. Further, although the interactive user interface 200 is from the perspective of the host vehicle 102, the interactive user interface 200 can also be generated from the perspective of the remote vehicle 104 by the HMI 152 and presented on the display 156. It is understood that other types of visual indicators for each vehicle and/or each emotion can be used. Additionally, in some embodiments where the vehicle has more than one passenger, the visual indicators can include an indication of each emotion of each passenger and/or the emotion of the entire vehicle (e.g., the emotion of all passengers).

Referring again to FIG. 4, at block 404, the method 400 includes outputting and/or rendering the interactive user interface. As discussed above, the HMI 134 generates the interactive user interface 200 and outputs same using the display 138. For example, the HMI 134 can output the interactive user interface 200 to the HUD 110. Referring again to FIG. 3, at block 308, the method 300 includes selecting a target vehicle from the one or more remote vehicles. The target vehicle is the vehicle that the host vehicle 102 will communicate with based on the determined emotions. For example, in one embodiment, block 308 includes receiving a user input indicating a target vehicle. For example, the processor 124 can receive input data at the interactive user interface 200 from the host passenger 106. In FIG. 2, a user input 202 is shown at the interactive user interface 200. Here, the user input 202 can be a touch input by the host passenger 106 at the HUD 110, which is displaying the interactive user interface 200. The user input 202 is a selection of a target vehicle 204. Thus, the input data indicates a target vehicle of the one or more remote vehicles 104 represented on the interactive user interface 200. Here, the target vehicle 204 is a vehicle that the host vehicle 102 and/or the host passenger 106 would like to communicate with (e.g., chosen by the host vehicle 102 and/or the host passenger 106). In one example, the target vehicle 204 has an emotion of happy and the host vehicle 102 would like to communicate with the target vehicle 204 based on the emotion of the target vehicle 204 for entertainment purposes.

In some embodiments, the processor 124 suggests a target vehicle and/or automatically selects a target vehicle at block 308. For example, in some embodiments, the processor 124 can automatically select a target vehicle based on the emotion of the host vehicle 102 and the emotions of the remote vehicles 104. The processor 124 can present the suggestion (not shown) using the HMI 134 and the host passenger 106 can determine whether to accept the suggestion by providing the user input. Alternatively, the processor 124 can automatically select the target vehicle for the host vehicle 102. The processor 124 can automatically suggest and/or select the target vehicle based on the emotion of the host vehicle 102 and the emotions of the remote vehicles 104. For example, the processor 124 can select a target vehicle having an emotion (e.g., happy) that matches the emotion of the host vehicle 102 (e.g., happy). Alternatively, the processor 124 can select a target vehicle having an emotion that is opposite the host vehicle 102. In some embodiments, the target vehicle is chosen with an emotion that can change the emotion of the host vehicle 102. For example, a target vehicle having an emotion of happy may be selected when the host vehicle 102 has an emotion of sad thereby affecting the emotion of the host vehicle 102 (e.g., less sad).

Referring again to the method 300, at block 310, the method 300 includes establishing vehicle-to-vehicle (V2V) communication with the target vehicle. For example, the processor 124 using the communication I/F 130 can establish an inter-vehicle communication channel 118 with the remote vehicle 104 (i.e., the target vehicle 204). At block 312, the method 300 includes managing the V2V communication channel. In one embodiment, block 312 includes facilitating communication between the host vehicle 102 and the target vehicle 204 (i.e., the remote vehicle 104) by receiving a host passenger input and transmitting the host passenger input to the target vehicle 204 (i.e., the remote vehicle 104). In this embodiment, the processor 124 can receive a host passenger input from the host passenger 106 via the HMI 134. For example, the host passenger input can be a voice input initiating a conversation with the target vehicle 204. The processor 124 can transmit the host passenger input to the target vehicle 204 (i.e., the remote vehicle 104) using the inter-vehicle communication channel 118. The processor 124 can continue to manage communication between the host vehicle 102 and the target vehicle 204 (i.e., the remote vehicle 104). Accordingly, the methods and systems described herein allow passengers of autonomous vehicles to communicate important information and/or have a conversation for on-road entertainment. The passengers are not isolated and can communicate with other on-road passengers in a personalized way.

The embodiments discussed herein can also be described and implemented in the context of "computer-readable medium" or "computer storage medium." As used herein, "computer-readable medium" or "computer storage medium refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for emotion detection and communication, comprising:

receiving host passenger data for a host passenger of a host vehicle;

determining an emotion of the host vehicle based on the host passenger data;

receiving remote passenger data for a remote passenger of one or more remote vehicles, wherein the one or more remote vehicles are determined to be in a predetermined area surrounding the host vehicle;

determining the emotion of the one or more remote vehicles based on the remote passenger data;

communicating the emotion of the host vehicle to the one or more remote vehicles and an emotion of the one or more remote vehicles to the host vehicle;

generating an output based on the emotion of the host vehicle and the emotion of the one or more remote vehicles, wherein the output is an interactive user interface providing an indication of the emotion of the host vehicle and an indication of the emotion of the one or more remote vehicles;

rendering the output to a human machine interface device in the host vehicle;

selecting a target vehicle from the one or more remote vehicles represented on the interactive user interface for communication with the host vehicle based on the emotion of the host vehicle and the emotion of the one or more remote vehicles represented on the interactive user interface; and establishing an inter-vehicle communication channel between the host vehicle and the target vehicle thereby allowing communication between the host passenger and a remote passenger of the target vehicle.

2. The computer-implemented method of claim 1, wherein selecting the target vehicle includes receiving input data from the host passenger at the interactive user interface indicating the target vehicle.

3. The computer-implemented method of claim 1, including managing the inter-vehicle communication channel between the host vehicle and the target vehicle.

4. The computer-implemented method of claim 3, wherein managing the inter-vehicle communication channel includes receiving a host passenger input and transmitting the host passenger input to the target vehicle.

5. The computer-implemented method of claim 1, wherein the predetermined area surrounding the host vehicle includes one or more remote vehicles determined as having a same destination as the host vehicle.

6. The computer-implemented method of claim 1, wherein the interactive user interface of a top view map representation of the host vehicle and the one or more remote vehicles.

7. A system for emotion detection and communication, comprising:

sensors for capturing host passenger data for a host passenger of a host vehicle and for capturing remote passenger data for a remote passenger of a remote vehicle, wherein the remote vehicle is within a predetermined area surrounding the host vehicle;

a human machine interface;

a display; and a processor, wherein the processor is operatively connected for computer communication to the sensors, the human machine interface, and the display, wherein the processor:

determines an emotion of the host vehicle based on the host passenger data and an emotion of the remote vehicle based on the remote passenger data;

generates an output based on the emotion of the host vehicle and the emotion of the remote vehicle, wherein the output is an interactive user interface providing an indication of the emotion of the host vehicle and an indication of the emotion of the remote vehicle;

transmits the output to the display selects a target vehicle on the interactive user interface for communication with the host vehicle based on the emotion of the host vehicle and the emotion of the remote vehicle; and establishes an inter-vehicle communication channel between the host vehicle and the target vehicle thereby allowing communication between the host passenger and a remote passenger of the target vehicle.

8. The system of claim 7, wherein the processor receives input data at the interactive user interface and selects the target vehicle based on the input data, wherein the input data indicates the target vehicle represented on the interactive user interface.

9. The system of claim 7, wherein the processor receives a host passenger input from the human machine interface.

10. The system of claim 9, wherein the processor transmits the host passenger input to the target vehicle using the inter-vehicle communication channel.

11. A non-transitory computer-readable storage medium including instructions that when executed by a processor, causes the processor to:

receive host passenger data for a host passenger of a host vehicle;

determine an emotion of the host vehicle based on the host passenger data;

determine one or more remote vehicles within a predetermined area surrounding the host vehicle;

transmit the emotion of the host vehicle to the one or more remote vehicles;

generate an output based on the emotion of the host vehicle and an emotion of the one or more remote vehicles, wherein the output is an interactive user interface providing an indication of the emotion of the host vehicle and an indication of the emotion of the one or more remote vehicles;

render the output to a human machine interface device;

receive input data at the interactive user interface, wherein the input data indicates a target vehicle of the one or more remote vehicles selected by the host passenger; and establish an inter-vehicle communication channel between the host vehicle and the target vehicle thereby allowing communication between the host passenger and a remote passenger of the target vehicle.

12. The non-transitory computer-readable storage medium of claim 11, including causing the processor to receive a host passenger input and transmit the host passenger input to the target vehicle using the inter-vehicle communication channel.

13. The non-transitory computer-readable storage medium of claim 11, including causing the processor to receive the emotion of the one or more remote vehicles that are within a predetermined area surrounding the host vehicle.

14. The non-transitory computer-readable storage medium of claim 11, including causing the processor to receive host passenger data for a second host passenger of the host vehicle and determine the emotion of the host vehicle based on the host passenger data for the host passenger and the host passenger data for the second host passenger.

* * * * *